United States Patent Office 2,959,553
Patented Nov. 8, 1960

2,959,553

LUBRICATING OILS CONTAINING ESTERS OF ACETYLENIC ALCOHOLS

Daniel C. Rowlands, Worthington, and Dickson Ellis Neunherz, Columbus, Ohio, assignors, by mesne assignments, to Air Reduction Company, Inc., New York, N.Y., a corporation of New York No Drawing. Original application Dec. 9, 1954, Ser. No. 474,294. Divided and this application Jan. 17, 1958, Ser. No. 709,444

8 Claims. (Cl. 252—56)

This invention relates to esters, more particularly to dibasic acid esters of aliphatic acetylenic alcohols, and to their preparation.

It is well known in the art that acetylenic alcohols tend to react differently than other aliphatic alcohols. One possible explanation is the presence of the acetylene linkage in the acetylenic alcohols, —C≡C—. Because of this grouping or triple bond, reactions occur in the conventional methods of preparing esters which result in the formation of undesirable side products. Thus, it is apparent that such methods are unsatisfactory and at best inefficient in preparing polycarboxylic acid esters of acetylenic alcohols.

One object of this invention is the preparation of new esters. A further object is the preparation of extreme pressure lubricants having enhanced load-carrying capacities. A still further object is to provide a novel and convenient process for the preparation of dibasic acid esters of acetylenic alcohols. A still further object is to provide a novel and convenient process for the preparation of dibasic acid esters of tertiary acetylenic alcohols.

These objects are conveniently accomplished in accordance with the present invention by reacting a monohydric acetylenic alcohol containing at least three carbon atoms in the longest carbon chain with a dibasic acid dichloride, in the presence of an acid acceptor and in a liquid medium which is chemically inert with respect to such reactants and products of reaction. This invention is applicable to primary, secondary, or tertiary monohydric acetylenic alcohols having the following formula:

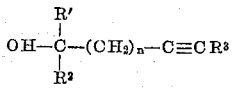

where $n$ is an integer including 0; and $R'$, $R^2$, and $R^3$ are hydrogen or hydrocarbon radicals, such as alkyl radicals. These acetylenic alcohols thus contain the following characteristic grouping or radical:

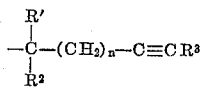

While the following examples will serve to illustrate the present invention more fully, they are not to be construed as limiting the scope of the invention.

Example 1

The mixture formed from 179.2 g. (3.2 moles) propynol, 221.5 g. (2.8 moles) pyridine, and 300 ml. benzene was stirred and heated to 60–70° C. 308.5 g. (1.4 moles) azelayl dichloride in 300 ml. benzene was added for 1.5 hours. The resulting mixture was stirred and heated at 70° C. for 1 hour, and then allowed to cool to room temperature. Pyridine hydrochloride was removed by filtration; and the filtrate was percolated through a 50-cm. x 14-mm. section of adsorption alumina. The solvent was removed by heating at reduced pressure. The residue was distilled at 138–148° C./0.1 mm. to obtain 206.6 g. di(2-propyn-1-yl) azelate, or dipropargyl azelate, representing 56% of the theoretical yield. The acid number of the acid ester was found to be 1.2, as compared to a theoretical acid number of 0. The azelate was dissolved in 800 ml. benzene-petroleum ether and filtered through alumina. The solvent was completely removed under a high vacuum. The yield of dipropargyl azelate was 188.3 g. or 51% of the theoretical yield. The acid number of the acid ester was found to be <0.1. Its saponification number was found to be 420, as compared to a theoretical saponification number of 425.6.

Example 2

The mixture formed from 191.0 g. (3.41 moles) propynol, 127.0 g. (1.65 moles), and 500 ml. benzene was stirred while 364.0 g. (1.52 moles) sebacyl dichloride was added over a period of two hours. The temperature was maintained at about 70° C. during the addition and for two hours thereafter. The cooled reaction mixture was washed with copious quantities of cold water until the washings were neutral. The benzene solution of the resulting ester was then dried over sodium sulfate, the solvent was removed, and the ester was distilled. The fraction which distilled in the range 170–185° C./0.6–0.8 mm. was found to be 365.1 g. (1.64 moles) of di(2-propyn-1-yl) sebacate, or dipropargyl sebacate, representing 87% of the theoretical yield. The acid number proved to be 2.3. The entire quantity was diluted to 1.5 liters with petroleum ether and then percolated through a 25-inch section of 80- to 200-mesh adsorption alumina which was supported in a 1⅛-inch O.D. glass tube. The solvent was removed exhaustively, and the residue was filtered. The acid number of the di(2-propyn-1-yl) sebacate (320.0 g., 1.44 moles, 76% yield) was 2.3. The saponification number of another sample prepared by the same method was 400, as compared to a theoretical saponification number of 403 for this ester.

Example 3

252.3 g. (3.0 moles) of 2-methyl-3-butyn-2-ol, 237.3 g. (3.0 moles) pyridine, and 750 ml. benzene were stirred while 271.3 g. (1.48 moles) crude adipyl dichloride (phosphorus oxychloride-free) with an equal volume of benzene was added. A precipitate formed at once and continued to grow. This voluminous precipitate soon made the stirring ineffective. The addition of more solvent did not improve the stirring. When all the chloride had been added over a period of three hours, the mixture was heated over a steam bath for some time and filtered while hot. The filtrate was concentrated to 600 ml. and washed twice with ice water. The filtrate was dried, the solvent was removed, and the residue was distilled to obtain: some pyridine-containing headings (75.0 g.; B.P., gaseous, 120° C./1 mm.); 117.0 g. di(2-methyl-3-butyn-2-yl) adipate, or methyl butynyl adipate (28% yield; B.P. 120–140° C./1 mm.); and 42.6 g. residues (B.P. >140°C./1 mm.). The adipate was combined with 33.0 g. material (B.P. 135–145° C./2 mm.) obtained from a previous run, and the entire product was redistilled. Some headings (5.2 g.; B.P. 110–120° C./0.8 mm.) and tailings (8.5 g. B.P.>130° C./0.8 mm.) were eliminated, and the ester fraction (135.0 g.; B.P. 120–130° C./0.8 mm.) was improved thereby. This ester fraction was taken up in 700 ml. petroleum ether and filtered through a 14-inch section of adsorption alumina. The solvent-free filtrate possessed a high acid number (10.5), so it was washed twice with sodium bicarbonate solution, twice with water, dried, and distilled. The fraction distilling at 125–135° C./1 mm. was taken as good adipate ester (85.0 g.). It possessed an acid number of 1.68 and a saponification number of 408 which is in close accord with the theoretical saponification number of 404.

Example 4

To a stirred solution of 2-methyl-3-butyn-2-ol (210.2 g., 2.5 moles), pyridine (198.0 g., 2.5 moles) and 700 ml. benzene at 50–60° C., 1:1 sebacyl dichloride (238.0 g., 0.996 mole) with benzene was added dropwise over a period of five hours. The reactants were stirred another ½ hour at 50° C. and allowed to stand at room temperature over 48 hours. The solids were removed by filtration, and the filtrate was washed with water. A tenacious emulsion formed, and after great difficulty, a rather poor separation was made. The organic material was dried over mixed sodium sulfate and calcium chloride, the solvent was evaporated, and the residue was taken up in petroleum ether and filtered through a 25-inch section of adsorption alumina. The ether was removed, and the crude ester was charged for distillation. However, since the ester seemed to decompose as the required distillation temperature was approached, it was cooled and percolated in petroleum ether through a fresh bed of alumina. The solvent was finally removed by heating at 2 mm. pressure for some time. Di(2-methyl-3-butyn-2-yl) sebacate, or methyl butynyl sebacate, (215.0 g., 0.64 mole, 64% yield) was obtained as a clear light-brown oil. It was titrated for free acid, and the acid number was found to be 0.22.

Example 5

A solution of 4-pentyn-2-ol (100.0 g., 1.19 moles), pyridine (118.0 g., 1.49 moles), and 400 ml. benzene was stirred while sebacyl dichloride (142.4 g., 0.595 mole) in 150 ml. benzene was added dropwise over a period of 1.5 hours at 55–65° C. The reactants were stirred another one hour at 55–65° C. Pyridine hydrochloride was removed by filtration, the solvent was evaporated, and the residual crude ester was diluted to one liter with petroleum ether. This ester was percolated through a 35-cm. × 14 mm. alumina section. The solvent was removed exhaustively by prolonged heating, finally at <2 mm. pressure, and the product was filtered. Di(4-pentyn-2-yl) sebacate was obtained as a light-yellow oil (114.2 g., 57.4% yield).

|  | Theory | Found |
| --- | --- | --- |
| Saponification No | 337 | 356 |
| Acid No | 0 | 1.7 |

The ester was repercolated through alumina (10 cm. section) as above, isolated as before, and found to have an acid number of 0.6.

Example 6

A solution of 4-methyl-1-pentyn-3-ol (100 g., 1.02 moles), pyridine (100.0 g., 1.26 moles), and 400 ml. benzene was stirred, while sebacyl dichloride (120.6 g., 0.504 mole) in 125 ml. benzene was added dropwise over a period of one hour at 55–65° C. The stirring was continued an additional one hour at 55–65° C. Pyridine hydrochloride was removed by filtration; and the solvent and excess pyridine were stripped off. The product was diluted to one liter with petroleum ether, and percolated through a 25-cm. × 14-mm. alumina section. The solvent was removed exhaustively by prolonged heating, finally at <2 mm. pressure, and the product was filtered. Di(4-methyl-1-pentyn-3-yl) sebacate was obtained as a light-yellow oil (106.6 g., 57.6% of theoretical yield).

|  | Theory | Found |
| --- | --- | --- |
| Saponification No | 310 | 316 |
| Acid No | 0 | 1.5 |

This ester was repercolated through alumina as above (10-cm. section), and isolated as before. The acid number remained unchanged, 1.5.

In the examples, benzene was used as the solvent or liquid reaction medium since it is relatively inert with respect to acetylenic alcohols, chlorides of saturated dibasic acids, pyridine, or products of reaction. In general, any inert organic solvent may be used for the reactants including aromatic hydrocarbons such as benzene, xylene, and toluene; dialkyl ethers such as n-butyl ether; and chlorinated aliphatic hydrocarbons such as carbon tetrachloride. The present invention likewise can be practiced with chlorides of other saturated aliphatic dibasic acids such as succinic, glutaric, pimelic, and suberic acids.

The preceding examples disclose the use of monohydric acetylenic alcohols containing a terminal ethinyl group ($-C \equiv CH$) and from 3 to 5 carbon atoms in the longest carbon chain. However, we have found that any alcohol containing a terminal ethinyl group and not more than about 10 carbon atoms in the longest carbon chain is generally very reactive; while an acetylenic alcohol having from 11 to 18 carbon atoms in the longest carbon chain appears to be less reactive in an esterification reaction. Hence, it is believed that acetylenic alcohols useful in the present invention preferably have not more than about 10 carbon atoms in the longest carbon chain. Other representative examples of acetylenic alcohols include 3,5-dimethyl-1-hexyn-3-ol; 3,6-dimethyl-1-heptyn-3-ol; 3-methyl-1-decyn-3-ol; and 3-methyl-1-dodecyn-3-ol.

The essentially neutral esters included in the present invention have the formula:

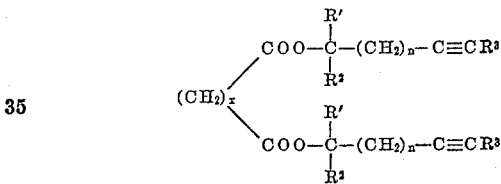

in which $x$ is an integer for the methylene group of the dibasic acid chloride, and

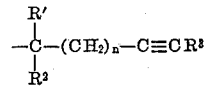

is the grouping or radical of the acetylenic alcohols as indicated hereinbefore. It will be noted that in the examples all the acetylenic alcohols contain the terminal ethinyl group so that $R^3$ is always a hydrogen atom.

The greatest advantage of the process of the present invention resides in the fact that dibasic acid esters of acetylenic alcohols can be made efficiently and conveniently in one step directly from acetylenic alcohols. Further, contrary to what would have been predicted in view of the prior art, tertiary acetylenic alcohols react as readily as primary and secondary acetylenic alcohols to produce the dibasic acid esters. It is believed that the acetylenic linkage of tertiary acetylenic alcohols modifies the characteristics of the hydroxyl group (OH) so that its reactivity resembles that of a hydroxyl group attached to a secondary aliphatic carbon chain. Hence, it is not surprising that tertiary acetylenic alcohols behave like aliphatic secondary alcohols in the esterification reactions described in Examples 3 and 4. Further, in the process of the present invention, the acetylenic alcohols are esterified without any modification of the acetylenic linkage and without any substantial dehydration. In the conventional methods, direct esterification of tertiary alcohols especially is difficult since they tend to dehydrate to form olefins.

The dibasic acid esters of the present invention can be used as extreme pressure lubricants. These lubricants are particularly suitable under extreme operating conditions, such as relatively high temperatures and pressures, which accounts for their widespread use in various types of heavily loaded gears and bearings. Extreme pressure lubricants are normally prepared by incorporating specific addition agents into a mineral oil base or other type of base lubricant in order to give it the required load-carrying capacity. As operating temperatures and pressures are increased, certain properties of the lubricants used become increasingly important, particularly high viscosity indexes, high flash points, low pour points, and high load-carrying capacities. The load-carrying capacity of a lubricant represents its ability to prevent metal-to-metal contact, and may be expressed on Shell 4-Ball Point B values (described in the Performance of Lubricating Oils, H. H. Zuidema.) The essentially neutral esters (or diesters) of the acetylenic alcohols have been found to have significantly high load-carrying capacities without the use of any addition agent. Point B, expressed in kilograms, ranged from 55 to 70 for the esters obtained in the six examples given above. Since commercial di-esters have only moderate load-carrying capacities, the esters of the present invention have unexpectedly valuable properties as extreme pressure lubricants. The inherently good load-carrying capacities of the novel esters are apparently a function of ethinyl hydrogen.

It is believed that mixtures of the novel esters with saturated esters provide lubricants of enhanced load-carrying capacities. Examples of saturated esters which are of interest in the field of extreme pressure lubricants include di-isoctyl azelate, di-isoamyl adipate, di-2-ethylhexyl glutarate, di-2-ethylhexyl sebacate, di-2-methylbutyl succinate, di-2-ethylhexyl maleate, di-2-ethylhexylphthalate, and isodecyl pelargonate.

The amount of each ester in the proposed lubricating composition is determined by such factors as elevation of the pour point and reduction of the viscosity index of the mixture to limits beyond which the lubricants as a class are unsatisfactory. The acetylenic ester of this invention can be used in amounts ranging preferably from 5% to 50% based on the weight of the total lubricating composition.

This application is a division of our copending application Serial No. 474,294, filed December 9, 1954, and now abandoned.

We claim:
1. A lubricating composition comprising essentially a major amount of a saturated aliphatic ester and a minor amount sufficient to impart extreme pressure properties to said lubricating composition of an essentially neutral ester corresponding to the general formula:

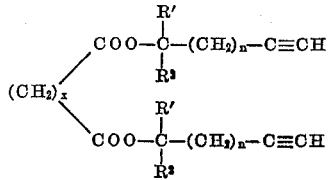

where $x$ is an integer from four to eight; $R'$ and $R^2$ are radicals selected from the group consisting of hydrogen and alkyl radicals; $n$ is a number selected from the group consisting of 0, 1 and 2, and the radical of the aliphatic monohydric acetylenic alcohol contains from three to five carbon atoms in its longest carbon chain.

2. A lubricating composition comprising essentially a major amount of a saturated aliphatic ester and a minor amount sufficient to impart extreme pressure properties to said lubricating composition of an essentially neutral ester corresponding to the general formula:

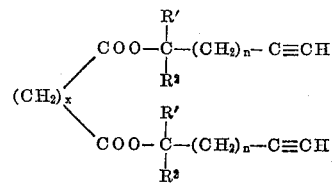

where $x$ is an integer from four to eight; $R'$ and $R^2$ are radicals selected from the group consisting of hydrogen and alkyl radicals; $n$ is an integer including 0; and the radical of the acetylenic alcohol contains from three to ten carbon atoms in its longest carbon chain.

3. A lubricating composition in accordance with claim 2 wherein said neutral ester is di(2-methyl-3-butyn-2-yl) sebacate.

4. A lubricating composition in accordance with claim 2 wherein said neutral ester is di(2-methyl-3-butyn-2-yl) adipate.

5. A lubricating composition in accordance with claim 2 wherein said neutral ester is di(4-pentyn-2-yl) sebacate.

6. A lubricating composition in accordance with claim 2 wherein said neutral ester is di(2-propyn-1-yl) azelate.

7. A lubricating composition in accordance with claim 2 wherein said neutral ester is di(2-propyn-1-yl) sebacate.

8. A lubricating composition in accordance with claim 2 wherein the load-carrying capacity of said neutral esters expressed in Shell 4-Ball Point B values ranges from 55 to 70 kilograms.

References Cited in the file of this patent
UNITED STATES PATENTS

| | | |
|---|---|---|
| 2,062,917 | Lawson | Dec. 1, 1936 |
| 2,221,662 | Rothrock | Nov. 12, 1940 |
| 2,340,701 | Schlichting et al. | Feb. 1, 1944 |
| 2,446,314 | Wagers et al. | Aug. 3, 1948 |
| 2,550,760 | Bishop | May 1, 1951 |

FOREIGN PATENTS

| | | |
|---|---|---|
| 505,421 | Belgium | Sept. 15, 1951 |